United States Patent [19]

Von Kohorn

[11] Patent Number: 4,616,304
[45] Date of Patent: Oct. 7, 1986

[54] ILLUMINATING DEVICE

[76] Inventor: Henry Von Kohorn, 215 Rocky Rapids Rd., Stamford, Conn. 06903

[21] Appl. No.: 733,936

[22] Filed: May 14, 1985

Related U.S. Application Data

[63] Continuation-in-part of Ser. No. 660,905, Oct. 15, 1984, Pat. No. 4,594,646, and a continuation-in-part of Ser. No. 660,906, Oct. 15, 1984, and a continuation-in-part of Ser. No. 697,168, Feb. 1, 1985, which is a continuation of Ser. No. 669,905, Nov. 8, 1984.

[51] Int. Cl.⁴ ............................................. F21V 33/00
[52] U.S. Cl. .................... 362/101; 362/190; 362/806; 362/318
[58] Field of Search ............. 362/101, 190, 205, 208, 362/296, 806, 802, 318

[56] References Cited

U.S. PATENT DOCUMENTS

| | | | |
|---|---|---|---|
| 963,057 | 7/1910 | Muschenheim | 362/101 |
| 4,344,113 | 8/1982 | Ditto | 362/101 |
| 4,390,928 | 6/1983 | Runge | 362/208 |

FOREIGN PATENT DOCUMENTS

| | | | |
|---|---|---|---|
| 641241 | 7/1928 | France | 362/101 |
| 1498436 | 10/1967 | France | 362/101 |
| 408187 | 12/1944 | Italy | 362/101 |

Primary Examiner—James C. Yeung
Attorney, Agent, or Firm—Parmelee, Bollinger & Bramblett

[57] ABSTRACT

Devices are disclosed for displaying three-dimensional objects intended to be centripetally viewed, such as flower arrangements, and for individually and uniformly illuminating a plurality of grouped flowers and the like in penetrating fashion. The devices comprise a watertight upper cavity containing flowers in separated, side-by-side relationship and a lower cavity containing the light source. The cavities are separated by a transparent shelf, the light traveling upwardly into the vase-like upper cavity, between and around the stems of most of the flowers so as to illuminate the inner as well as outer reaches of the foliage of the flowers. The light source is positioned below and in close proximity to the flowers, thus reducing scattering of light, power consumption and glare.

9 Claims, 4 Drawing Figures

U.S. Patent  Oct. 7, 1986  4,616,304
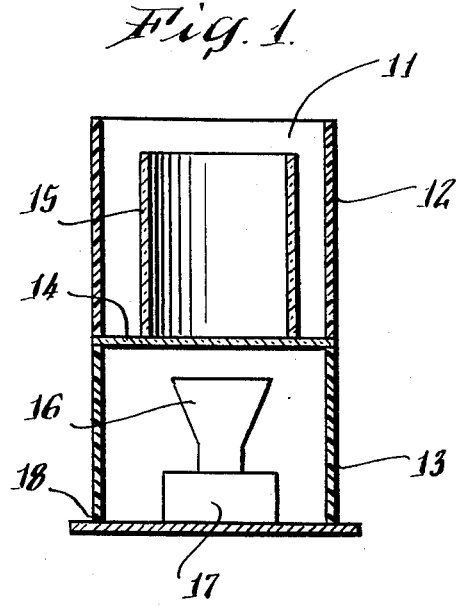
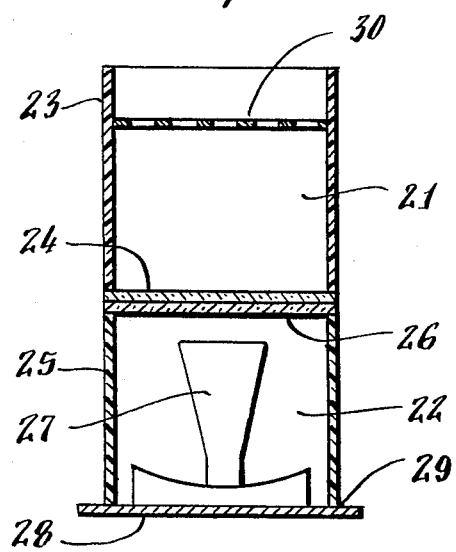
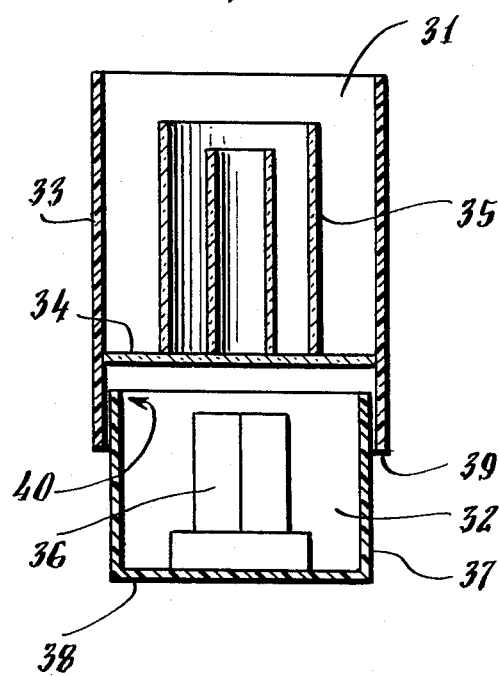
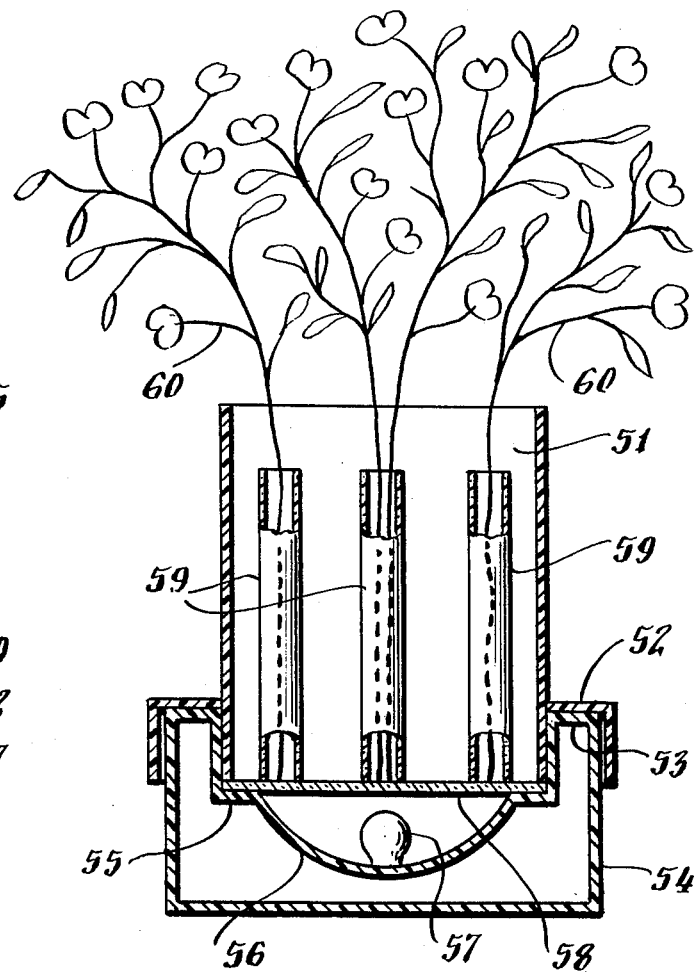

ILLUMINATING DEVICE

This application for letters patent is a continuation-in-part of applications Ser. No. 660,905, filed Oct. 15, 1984 U.S. Pat. No. 4,594,646; Ser. No. 660,906, filed Oct. 15, 1984; and Ser. No. 697,168, filed Feb. 1, 1985, which is a continuation of Ser. No. 669,905 filed Nov. 8, 1984.

BACKGROUND OF THE INVENTION

The present invention relates to the directional and individual lighting of a plurality of separate, three-dimensional objects grouped in side-by-side relationship. It particularly relates to the illumination of the foliage of the inner, as well as outer flowers in a flower arrangement, such as in a vase.

Conventional methods used to light three-dimensional objects involve the use of spotlights, ceiling and tracklights, normally beamed at and around the object to be illuminated from a distance. The greater the distance, the greater the loss of lumens and the degree of scattering of the light beyond the confines of the object. Another serious drawback of spotlights and the like is the glare produced. Glare is defined as an irritating brightness of light, such as is produced by exposing the eyes of observers to the direct view of a light source. Although some spotlights in current use having deeply recessed lamps, glare is nevertheless experienced by persons whose field of vision extends from a point behind the illuminated object towards the light source.

The present invention is not intended to be applied in the lighting of essentially two-dimensional objects, such as walls, paintings and other planar surfaces, nor in area lighting. The lighting of flower arrangements, i.e. of potted flowers in a vase and the like, is currently achieved through the use of one or more spotlights. These have the drawback of the light striking only some of the surfaces of the flower arrangement. The flowers on the inside of the arrangement receive little or no light.

It therefore is a principal object of the present invention to illuminate the inner members of a plurality of grouped members of a three-dimensional object, such as the flowers near the center of a flower arrangement.

It is another object to individually illuminate loosely spaced unpotted flowers, so as to envelop the foliage of each flower. It is yet another object to provide the light source in close proximity to such flowers, so as to shorten the light path, to reduce electric power requirements and prevent scattering of the light.

It is another object of the invention to illuminate the inner, as well as outer, reaches of a flower arrangement intended to be viewed centripetally by observers encircling the flower arrangement without exposing any of such observers to a direct view of the light source.

It is still another object to provide individual illumination to mixed natural and artificial flowers, some of which may require insertion in water, while others do not. Another object of the invention is to provide illumination to the foliage of flower arrangements in a highly pleasing, economical and effective manner.

SUMMARY OF THE INVENTION

The above identified co-pending applications disclose the following characteristics of said inventions, which are shared with the present invention. The light source is disposed below and proximate to a three-dimensional object to be centripetally viewed. The light generated is visible essentially only by its reflections from the surfaces of the illuminated objects, and the eyes of observers, even if grouped around the objects in an encircling fashion, are shielded from direct view and the glare of the light source. The light is directed without substantial scattering towards the objects, which are illuminated in an enveloping fashion. In addition, the present invention produces novel and highly attractive lighting effects by individually illuminating virtually each one of the flowers in an arrangement of unpotted flowers, including the foliage of those flowers placed innermost in a vase or similar container. This is achieved by maintaining the flower stems in an upper, vase-like cavity in separated, side-by-side relationship, so as to permit the upward passage of light between and around the flower stems, and by providing in a lower cavity a source of light directed towards the flowers through a watertight transparent partition shelf separating the vase and the light source housing.

BRIEF DESCRIPTION OF THE DRAWINGS

FIG. 1 is a diagrammatic, cross-sectional side elevation of the device having a one-piece housing partitioned into an upper, vase-like cavity and a lower cavity accommodating the light source.

FIG. 2 is a diagrammatic, cross-sectional side elevation of the device comprising upper housing means for the flowers of a flower arrangement resting on separate lower housing means open at the bottom enclosing the light source.

FIG. 3 is a diagrammatic, cross-sectional side elevation of the device comprising compartmentalized upper housing means for the objects, detachably mounted on lower housing means enclosing the light source.

FIG. 4 is a diagrammatic, cross-sectional side elevation of the device containing separated flowers, comprising upper housing means resting on appropriately configured lower light source and reflector housing means.

DETAILED DESCRIPTION OF THE INVENTION

FIG. 1 depicts an illuminating device comprising housing means 11, which consists of upper peripheral wall portion 12, lower peripheral wall portion 13 and transparent shelf 14. Said housing thus forms an upper and a lower cavity. Housing 11 is made of a one-piece acrylic molding, or may be made of glass or other transparent material, so that partition shelf 14 and any other parts of housing 11 that are not made opaque or light passage-impeding, are transparent and light-conductive. Upper wall portions 12 normally are not transparent and are treated to be opaque, translucent or otherwise light passage-impeding. The term light passage-impeding as used herein is intended to pertain to the property of reducing the amount of light passing through an object, whether through the use of coatings, filters or the choice of materials used in such object. Lower wall portions 13 are opaque. They may for instance be painted black or another color on the outside and white on the inside.

The upper cavity is bounded by wall portions 12 and shelf 14. It is open at the top and serves as a watertight receptacle or vase. It further contains an inner receptacle or vase 15, the wall of which serves as spacing means for the objects, which are positioned in loosely spaced relationship in said inner vase 15, as well as in the compartment formed between the wall of vase 15 and the upper portion 12 of the peripheral wall. The wall of vase 15 consists of a light-conductive material and its lower edge rests on transparent shelf 14. Vase 15 may have a transparent bottom resting on shelf 14 and may be a separate removable unit. The lower cavity of housing 11, bounded by wall portions 13 and shelf 14 is open at the bottom. It is dimensioned and configured to contain light source 16, which is a fluorescent lamp mounted on base 17. Base 17 or other lamp support has, or comprises a member having, a reflective upper surface adapted so that light shining downward is redirected upwardly. Light generated by light source 16 passes upwardly through partition shelf 14 and passes between and around the loosely spaced objects in the upper cavity, enveloping and illuminating each one of the plurality of said objects. Spacing means, such as inner vase 15, ensure that the objects are not pressed together, which would impede the upward passage of light to the upper reaches of the objects. For instance, in the case of a bouquet or arrangement of cut flowers, a large number of the stems and lower portions of the individual flowers are inserted into the space between wall of inner vase 15 and peripheral wall portion 12 in loosely spaced side-by-side relationship, leaving spaces between the stems to permit light to envelop each stem and travel upwardly around and between the lower flower portions to their upper foliage, i.e. the blossoms and leaves protruding above housing 11. While the term "cut flowers" is self-explanatory, the term "unpotted flowers" is intended to include flowers without soil, but having roots and the like permitting the upward passage of at least some light, and being fed hydroponically in liquid mineral solutions. All decorative plants, ferns, leaves and the like that lend themselves to the type of lighting described are intended to be included in the term "flowers."

The light in the lower cavity generally will not be visible through wall portions 12 and 13, which are coated, sprayed, painted or otherwise made opaque, although, if desired, translucent or untreated areas in the clear wall of housing 11 may be provided with ornamental designs, serve as night lights, or contain openings which can be covered. The inside wall surfaces of housing 11 are light-reflective, except for the upper portions 12, which have non-reflective inside surfaces. The term reflective is intended to relate to surfaces capable of reflecting a significant portion of light, in contrast with light-absorbing surfaces. Such reflective surfaces are intended to include glossy paints and coatings of any color, as well as metallic and plastic surfaces whether or not light in color. A light-reflective surface is provided inside the lower cavity containing the light source 16, in order to aid in the upward projection of light to and through the transparent partition 14.

All of the peripheral wall portions of housing 11 are watertight and joined in a watertight manner. Partition shelf 14 is watertight and attached to the inside wall surface of housing 11 in a watertight manner, so that water in the upper cavity, i.e. in and around inner vase 15 cannot enter the lower cavity containing the light source. Also, any water running down the outside wall surfaces of housing 11, whether caused by rain or the overfilling of the upper cavity, cannot enter the light source housing. In order to prevent such occurrence which could produce a short circuit in the light source, it is additionally provided that the lower rim 18 of wall portion 13 extends downwardly to a level below that of any exposed, electrically charged components of the light source.

The device therefore is suitable for the indoor or outdoor display of individual flowers, groups of flowers, or bouquets and flower arrangements. The invention produces a thoroughly penetrating illumination of the inside of the foliage of a flower arrangement not normally receiving illumination from spotlights or area lights. The lighting effect created throughout such a flower arrangement also is much more uniform and attractive. Observers grouped around the device see essentially only the light reflected from the surfaces of the illuminated objects and are not exposed to glare.

The spatial relationship of the members and components of the device greatly shortens the path traveled by the light between the lamp and the object to be illuminated. Furthermore, the directional lighting from close proximity minimizes scattering of light, with attendant increased efficacy and power savings. The advantage of being able to centripetally (radially inwardly) view the objects illuminated by the device described herein without exposing any of the observers to glare, is an important feature of the present invention.

FIG. 2 is a diagrammatic view of another embodiment of the device, comprising upper housing means 21 and lower housing means 22. Upper housing 21 is open at the top and is formed by peripheral wall portions 23 and transparent bottom shelf 24. Lower housing 22 is open at the bottom and is formed by peripheral wall portions 25 and transparent top shelf 26.

The bottom shelf 24 of the upper housing 21 rests on top shelf 26 of lower housing 22. The two transparent shelves 24 and 26 form an optical interface permitting the passage of light from the lower housing 22 containing electric light source 27 to the upper housing 21, which is adapted to serve as a receptacle for the objects to be illuminated, such as a vase in the case of flowers. Light source 27 and the lower rim 29 of lower housing 22 rest on a common support member 28 provided with a light-reflective surface. Electric power is conducted to light source 27 through support member 28 by well known means. Support member 28 includes an appropriate lamp holder or base, which may be recessed therein (not shown).

Housings 21 and 22 are of waterproof construction, so that water in or around upper housing 21 cannot enter lower housing 22 and cannot contact any of the electrically charged components of light source 27. Support member 28 is configured so that water running down the outside surfaces of wall portion 25 and lower rim 29 drains to the outside.

Spacing means 30 consist of an open horizontal wire mesh which permits inserting the stems of individual flowers in the interstices of the mesh. The spacing means may comprise more than one such open mesh; they may also take the form of open mesh fabrics and sheets, of sleeves, rings and hooks, of extruded, molded or fabricated structures, or any other members achieving the purpose of maintaining the objects in separated, essentially parallel, vertical attitude, while permitting light to pass through said spacing means and between the objects. According to a preferred embodiment of spacing means, a horizontal acrylic sheet of sufficient thickness is provided with a plurality of vertical holes serving as sleeves for flower stems.

Upper housing 21 rests on lower housing 22 without being mounted thereon. Alternatively, the transparent shelves 24 and 26 may be adhered to each other in a manner not substantially impeding the upward passage of light. Normally, lower housing 22 and lamp support 28 are dimensioned so as to reduce the distance between lamp 27 and shelf 26 to the absolute practical minimum, which in many instances will be of the order of one centimeter or less.

FIG. 3 is yet another embodiment of the device comprising two separate, cylindrical, detachable housings loosely joined by placing upper housing 31 on lower housing 32. The upper peripheral wall portions 33 and transparent bottom shelf 34 of housing 31 form a watertight, vase-like cavity containing spacing means 35. According to a preferred embodiment, spacing means 35 consist of a plurality of concentric acrylic cylinders, open at the top and bottom, resting on transparent bottom shelf 34. Said cylinders may be detachable, or they may be adhered to bottom shelf 34; they may also be molded in one piece with bottom shelf 34. The cylinders thus form a plurality of vertical annular compartments.

Upper housing 31 has lower peripheral wall portions 39 extending downwardly below the upper rim 40 of lower housing 32. Also, upper housing 31 has a larger horizontal dimension than lower housing 32, so that water falling from lower peripheral wall portions 39 cannot enter light souce housing 32.

Flowers are distributed around the annular spaces created by said cylinders and are maintained in separated, side-by-side relationship in said spaces, which may be further sub-divided for more precise positioning of the flowers. The transparent nature of the spacing means permits light to travel upwardly through the hollow spaces in, and through the walls of, said vertical spacing means.

Lower housing 32 containing light source 36 is open at the top and is formed by peripheral walls 37 and bottom closure 38, which are joined in a watertight mode. Water flowing down the sides of the upper housing wall cannot contact light source 36 in lower housing 32, even though the two housings are loosely joined by their respective walls and made waterproof only by their configurations and spatial relationship.

Light source 36 comprises twin fluorescent tubes housed in a transparent enclosure, starter and ballast. The inner surface of bottom closure 38 is at least in part light-reflective.

Normally, the upper rim of peripheral wall portions 33 of the vase-like housing 31 protrudes upwardly above spacing means 35, including any of its compartment walls sub-dividing said vase. The uppermost portions of peripheral wall 33 therefore serve as additional shielding means against direct view by persons present of the light traveling upwards from said transparent bottom shelf 34. Thus, persons not peering directly into the vase from above, will not be exposed to glare. In order to prevent even slight reflections of light from the device directly into the eyes of observers, the inner surface of the uppermost portion of the peripheral wall 33 is adapted by known means to be non-reflective or light-absorbent.

When the device consists of two separate housings, the lower housing may be made of opaque material, such as polyvinylchloride, colored acrylic plastic or other materials blocking light. FIG. 4 depicts still another embodiment of the device. Upper housing 51 is a watertight recptacle having mounted thereon bracket 52, which may, but need not, loosely engage and rest on upper rim 53 of lower housing means 54. Bracket 52 is attached to housing 51 in a watertight manner and surrounds the entire wall of the upper cavity formed by housing 51, so as to function as a waterproof skirt overlapping the upper part of lower housing 54. The lower housing 54 consists of molded plastic configured to include upper rim portion 53, seat portion 55 and concave portion 56, all forming a cavity adapted to contain a light source and a reflective surface.

Upper housing 51 preferably rests on seat 55. Bracket 52 overhangs rim 53 so that water running down the sides of housing 51 and bracket 52 cannot enter the cavity of lower housing means 54. The concave portion 56, which represents part or all of the lower cavity, is dished, parabolic or of such other configuration as to reflect light upwardly.

Light source 57 comprises a tungsten halogen, or similar lamp and appropriate holder, which holder may be recessed in the bottom portions of lower housing 54. Its light is either projected directly upwardly, or reflected upwardly through transparent vase bottom 58 into the upper cavity in housing 51. The stems of flowers 60 are inserted into the compartments formed by spacing means 59, which maintain the flowers in essentially vertical, separated position, permitting light to travel upwards between and around the flower stems to the inner and outer reaches of the foliage. As a result, essentially all of the flowers of the arrangement are uniformly illuminated in a highly attractive manner. To minimize loss of light, the lower portions of the inside surfaces of upper housing 51 are adapted to be light-reflective. To prevent the exposure of observers surrounding the device to irritating glare, the upper portions of the inside surfaces of upper housing 51 are adapted so as not to reflect light. The only light that will therefore by visible is that reflected from the foliage of the flowers.

The distance between light source 57 and the bottom portion of the flowers is less than 20 centimeters and in most cases less than 10 centimeters.

In the embodiment of FIG. 4, spacing means 59 consist of a plurality of vertically extending, watertight, hollow members, such as open acrylic or glass tubes resting on transparent bottom 58. Said tubes have upper light-emitting edges and lower light-receiving edges which may be adhered to or may simply rest on transparent bottom 58. They may be open or closed at their lower ends. One or more flowers are inserted into each tube. This permits using a mixture of natural flowers requiring water in said tubes, and artificial or dry flowers not requiring water. Flowers may of course also be placed between said tubes with or without water.

As an example, a miniaturized device of the kind described is sunk into a table top having an opening through which the vase portion of the device protrudes upwardly. The device is suitably supported below the table. The vase contains spacing means in the form of a plurality of watertight, removable acrylic tubes closed at the bottom. A number of dry or artificial flowers, fern-like or other plants are a permanent part of a table centerpiece and are placed in the spaces around said tubes, said spaces containing no water. Freshly cut, natural flowers are inserted singly or in small groups in each of said tubes containing water. In this manner, the natural flowers can periodically be replaced by removing and re-filling said tubes without disturbing the rest of the table centerpiece. Such a device preferably is battery-powered.

It should be understood that even though the peripheral wall of the upper housing of the device may be light passage-impeding with respect to light in the vase portion of the device shining through said wall in a lateral direction, such as would obtain if its surface were covered, painted or coated, such light impeding or blocking property does not necessarily apply to the interior light conductive property of such wall. Thus the vertically light-conductive wall of the upper cavity of the device may be utilized to conduct and project light towards the object. The lower edge of said wall receives light and its suitably shaped upper edge emits light in predetermined directions.

When the spacing means comprise vertically extending, light-conductive members, the upper light-emitting edges of selected members may be configured to project light in desired, predetermined directions, so as to highlight special features or surfaces of the objects. By using colored, light-conducting material in these members, different features of the objects may be lighted in different colors.

It should be understood that the herein described devices and their housings may have different top plan cross-sections, including circles, ovals, squares, rectangles and other configurations.

Although the present invention is particularly advantageous in the illumination of unpotted flowers, other applications of the invention are not ruled out. The devices disclosed can be employed in the lighting of any individual objects intended to be viewed in loosely spaced or separated side-by-side relationship, such as in the showing of gems and minerals, objects d'art, sculptures, theatrical props, advertising signs and displays, and the like.

Other embodiments and configurations of devices described may devised by persons skilled in the art without deviating from the principal features of the present invention, and these are intended to be included within the scope of the appended claims.

What is claimed is:

1. An apparatus for displaying a stemmed flower arrangement having a plurality of grouped inner and outer, unpotted flowers, and individually illuminating said stemmed flower arrangement in a penetrating manner comprising:

an upper, vertically elongated housing means comprising:
   a watertight peripheral wall having an upper opening and rim, said upper housing means having means for preventing the lateral passage of light and having a non-reflective surface on the inside of the upper portion of said wall,
   a watertight shelf having transparent portions joined to said peripheral wall below said rim in a watertight manner forming a first cavity adapted to serve as a vase having dimensions so as to accommodate the stems of said flowers in substantially vertical, loosely spaced relationship,
   spacing means disposed above said shelf, comprising light-conductive members forming a plurality of hollow compartments having light-conductive vertical walls adapted to receive light through said transparent shelf portions and to project said light from their upper edges in predetermined directions towards said inner flowers, and further adapted to maintain said stems in said compartments in separated, side-by-side relationship without substantially impeding the upward passage of light between said stems,
   wherein the height of said spacing means is such that said rim and upper portions of the first peripheral cavity wall protrude above said spacing means,
   lower housing means having a watertight, light-passage impeding, peripheral wall, forming a second cavity disposed below said first cavity, said second cavity being adapted to accommodate a central light source and a light-reflective surface disposed below said light source,
   an electric light source comprising a lamp and a lampholder, said lamp being disposed in said second cavity below and in close proximity to said shelf and said lampholder being positioned so as not to impede the upward passage of light, and
   a light-reflective surface means provided in said second cavity and adapted to reflect light upwardly, wherein
   illumination generated by said light source is projected or reflected upwardly through said transparent portions of said shelf towards the loosely spaced stems of the flowers in said vase, and through the spaces between and around said flower stems and through said light-conductive compartment walls towards the foliage of substantially all inner and outer flowers in a penetrating manner,
   said illumination being provided to the inner and outer reaches of the flower foliage by a short upward light path, whereby,
   the eyes of observers grouped in an encircling fashion around the flower arrangement are shielded from direct view of the light source and from reflections of the light from said apparatus and thereby view only reflections of light from said flowers.

2. The apparatus as claimed in claim 1, said spacing means comprises a plurality of hollow compartments having vertical light-conductive walls forming an optical interface with said transparent shelf for receiving and transmitting illumination from said light source through said walls and from the upper edges thereof on said flowers positioned and separated therein.

3. The apparatus as claimed in claim 2 wherein said plurality of hollow compartments are arranged concentrically one within the other.

4. The apparatus as claimed in claim 2 wherein said plurality of hollow compartments are each water-tight and separated from each other in said first cavity thereby being adapted to receive fresh flowers requiring water and dry or artificial flower arrantements without water in the spaces between compartments.

5. The apparatus of claim 1, wherein said first cavity is formed by an upper peripheral wall having a first transparent shelf joined to the lower end of said upper wall in a watertight manner and wherein said second cavity is formed by a lower, light passage-impeding peripheral wall having a second transparent shelf joined to the upper end of said lower second wall, said first transparent shelf resting on said second transparent shelf and forming an optical interface with it.

6. The apparatus of claim 1, wherein said first cavity is formed by an upper peripheral wall having a transparent shelf joined to the inside of said upper wall above its lower end in a watertight manner; wherein said second cavity is formed by a lower peripheral wall and a bottom closure; wherein said first cavity has horizontal dimensions larger than those of the second cavity; wherein said transparent shelf associated with the upper housing removably rests on the upper rim of the lower peripheral wall of the lower housing; and wherein the lower portions of the upper peripheral wall overlap the upper portions of the lower peripheral wall.

7. The apparatus of claim 1, wherein said first cavity is formed by an upper peripheral wall and a transparent shelf adhered to said wall below its upper rim in a watertight manner; wherein said second cavity is formed by a light passage-impeding peripheral wall having horizontal dimensions larger than those of the upper peripheral wall; wherein the peripheral wall of the second cavity extends upwardly above said transparent shelf; and wherein means are provided to support said upper housing means in a position leaving space in said second cavity for said light source and said reflective surface.

8. The apparatus of claim 1, wherein said spacing means are comprised of at least one horizontally disposed mesh.

9. The apparatus of claim 1, wherein the light path from the light source to the flower stems does not exceed approximately 10 centimeters.

* * * * *